(12) United States Patent
Kozich et al.

(10) Patent No.: US 10,364,376 B2
(45) Date of Patent: Jul. 30, 2019

(54) ADHESIVE COMPOSITION

(75) Inventors: Martin Kozich, Vienna (AT);
Bernhard Seidl, Vienna (AT); Bart Levecke, Mechelen (BE); Heiko Lipkens, Kessel-Lo (BE)

(73) Assignees: TIENSE SUIKERRAFFINADERIJ N.V. (BE); AGRANA STAERKE GMBH (AT)

( * ) Notice: Subject to any disclaimer, the term of this patent is extended or adjusted under 35 U.S.C. 154(b) by 108 days.

(21) Appl. No.: 14/394,458

(22) PCT Filed: Apr. 26, 2012

(86) PCT No.: PCT/EP2012/001782
§ 371 (c)(1),
(2), (4) Date: Oct. 14, 2014

(87) PCT Pub. No.: WO2013/159789
PCT Pub. Date: Oct. 31, 2013

(65) Prior Publication Data
US 2015/0050437 A1    Feb. 19, 2015

(51) Int. Cl.
| | |
|---|---|
| C09J 101/00 | (2006.01) |
| C09J 103/00 | (2006.01) |
| C08B 31/00 | (2006.01) |
| C09J 103/02 | (2006.01) |
| C09J 103/04 | (2006.01) |
| B32B 1/02 | (2006.01) |
| B32B 7/12 | (2006.01) |
| C08L 3/02 | (2006.01) |
| C08L 89/02 | (2006.01) |

(52) U.S. Cl.
CPC ............. *C09J 103/00* (2013.01); *B32B 1/02* (2013.01); *B32B 7/12* (2013.01); *C08B 31/003* (2013.01); *C09J 103/02* (2013.01); *C09J 103/04* (2013.01); *B32B 2250/02* (2013.01); *B32B 2255/24* (2013.01); *B32B 2439/60* (2013.01); *B32B 2519/00* (2013.01); *C08L 3/02* (2013.01); *C08L 89/02* (2013.01); *C08L 2205/02* (2013.01); *C08L 2205/03* (2013.01); *Y10T 428/13* (2015.01)

(58) Field of Classification Search
CPC ...... C09J 103/02; C09J 103/08; C09J 189/00; C08K 3/00196; C08L 3/02; C08L 3/08
USPC .......................................... 156/336; 428/34.7
See application file for complete search history.

(56) References Cited

U.S. PATENT DOCUMENTS

| | | | |
|---|---|---|---|
| 8,470,119 B2 | 6/2013 | Mentink et al. ............. 156/325 |
| 2007/0240823 A1* | 10/2007 | Alevisopoulos ....... C09J 103/02 |
| | | | 156/336 |
| 2012/0121873 A1* | 5/2012 | Mann .................... C09J 103/00 |
| | | | 428/211.1 |

FOREIGN PATENT DOCUMENTS

| | | | |
|---|---|---|---|
| EP | 0990687 | 4/2000 | ............ C08B 31/00 |
| FR | 2855524 | 12/2004 | ............ C09J 103/02 |
| FR | 2873701 | 2/2006 | ............ C08B 31/00 |

(Continued)

OTHER PUBLICATIONS

International Search Report issued in corresponding application No. PCT/EP2012/001782, dated Jan. 31, 2013 (3 pgs).

*Primary Examiner* — Ellen S Wood
(74) *Attorney, Agent, or Firm* — Hayes Soloway P.C.

(57) ABSTRACT

A starch-based adhesive composition, having a tan δ at 10 Hz and 20° C. of at least 1.40 is provided. The adhesive composition is in particular useful as labelling adhesive. Also provided is a bottle that has a label whereby the label is attached to the bottle by the aforesaid adhesive composition.

15 Claims, 1 Drawing Sheet

| Zone | 1 | 2 | 3 | 4 | 5 | 6 | 7 | |
|---|---|---|---|---|---|---|---|---|
| T [°C] | 20 | 30 | 40 | 50 | 80 | 100 | 110 | 110 |

(56) References Cited

FOREIGN PATENT DOCUMENTS

| WO | WO9613238 | 5/1996 | ............. | A61F 13/56 |
| WO | WO2004108853 | 12/2004 | ............ | C09J 103/02 |
| WO | WO2007120653 | 10/2007 | ............ | C09J 103/04 |

* cited by examiner

ADHESIVE COMPOSITION

The invention relates to an adhesive composition, in particular to a starch-based adhesive composition.

Starch-based adhesive compositions are as such known. WO-A-2007/120653 discloses adhesives useful for industrial bottle labelling. The adhesives comprise at least one starch component and at least one protein component.

Although the known adhesive compositions are promoted for use in industrial bottle labelling, it was found that the known compositions suffer from drawbacks when the industrial labelling is carried out at high speeds of 30,000 or 40,000 or even 50,000, 60,000, 70,000 or more bottles per hour. These drawbacks include undesirable splashing and excessive machine pollution.

SUMMARY OF THE INVENTION

It is the objective of the present invention to reduce or even eliminate the observed drawbacks.

The said objective reached in that the adhesive composition has a tan δ at 10 Hz and 20° C. of at least 1.40.

It is an advantage of the adhesive compositions according to the invention that they can be suitable for use in industrial labelling at very high speeds, whereby the drawbacks of the known compositions are greatly reduced.

BRIEF DESCRIPTION OF THE DRAWINGS

In the FIGS.

DETAILED DESCRIPTION OF THE INVENTION

Figure 1:
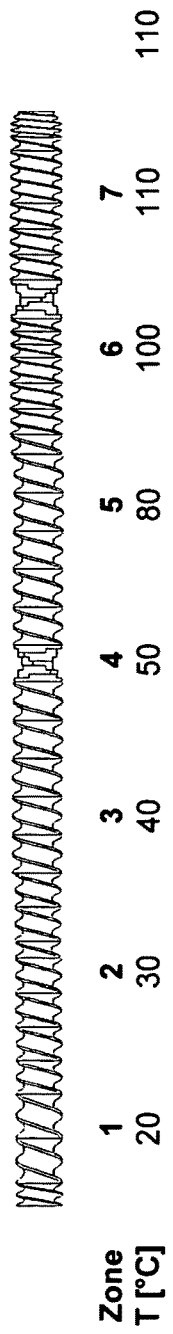
FIG. 1 illustrates the configuration and temperature profile of an extruder screw as used in Example 1.

WO-A-2004/108853 relates to the use of a native or modified leguminous starch for producing an adhesive labelling composition. The leguminous starch has an amylose content ranging between 25 and 60 percent by weight (dry/dry) and can be pea starch. The adhesive composition can be used for labelling glass or plastic bottles.

WO-A-96/13238 discloses an absorbent article having an adhesive on the bodyfacing surface for securement of the article to the wearer. The adhesive has a rheological property tan delta at 20° C., ranging from about 0.01 to about 0.6 at a frequency of about 0.1 radian per second and a tan delta ranging from about 0.1 to about 1.7 at a frequency of about 1000 radians per second. The adhesive is a pressure sensitive adhesive, such as a hot melt adhesive.

FR-A-2873701 relates to a cross-linked partially soluble starch characterized in that it is crosslinked using a cross-linking agent chosen wisely and that it has, dispersed in water at 20° C., measured by partial solubility test A, at most 20%, preferably between 0.5 and 15%, preferably between 1.0% and 10% and a Brookfield viscosity between 500 and 5000 mPa·s at a concentration between 10 and 20% dry matter (% DM). FR-A-2873701 does not mention tan δ values of the of adhesive compositions prepared from the cross-linked partially soluble starches, nor any consequences thereof.

FR-A-2855524 relates to the use of a native or modified leguminous starch for producing an adhesive labelling composition. Said leguminous starch has an amylose content ranging between 25 and 60 percent by weight (dry/dry) and can be embodied as pea starch, especially pea starch having an amylose content of at least 30 percent but less than 50 percent by weight. The adhesive composition can advantageously be used for labelling glass or plastic bottles and can contain another natural polysaccharide polymer or protein polymer in addition to the leguminous starch, for example another native or modified leguminous or non-leguminous starch, particularly a starch having an amylopectin content of at least 80 percent by weight (dry/dry).

The invention relates to a starch-based adhesive composition. As meant herein, the term 'starch-based' means that a starch compound, or, in case the adhesive composition contains more than one starch compound, the sum of all starch compounds in the adhesive composition, is the biggest dry matter contributor to the adhesive nature of the adhesive composition. As meant herein, the term starch compound can mean both an unmodified starch or a modified starch. If the adhesive composition according to the invention contains more than one starch compound, the sum of all starch compounds in the adhesive composition of the invention can be a mixture of one or more unmodified starches, a mixture of one or more modified starches, or a mixture of one or more unmodified starches with one or more modified starches. The starch may be in native form or in a processed form. Preferably, a starch compound or the sum of all starch compounds in the adhesive composition is the overall biggest dry matter contributor to the adhesive composition. Preferably, the sum of all starch compounds in the adhesive composition is at least 5 or 10 wt. % of the adhesive composition as a whole, including solvents; more preferably, the sum of all starch compounds in the adhesive composition is at least 15, 20, 25, 30, or even 35 wt. %. The sum of all starch compounds in the adhesive composition is preferably at most 60 wt. %, more preferably at most 55, 50, or 45 wt. %.

The adhesive compositions according to the invention harden via the evaporation of a solvent. This type of adhesive compositions is herein also referred to as solvent-type adhesive compositions. In the present invention, the solvent preferably is water. The adhesive composition of the present invention may be described as a solvent-type starch based adhesive composition, preferably an aqueous starch-based adhesive composition. Thus, the adhesive compositions according to the invention are not of the same class as pressure sensitive adhesives as referred to in e.g. WO-A-96/13238, because pressure sensitive adhesives do not require any step other than the mere application of pressure to form an adhesive bond. Adhesive compositions according to the invention are not pressure sensitive adhesives.

Examples of starches that are preferred in preparing the adhesive composition according to the invention include potato, maize (corn), wheat, rice, tapioca and leguminous starches. Preferred are starches having a high amylopectin content such as amylopectin potato, waxy maize (corn), waxy rice and waxy wheat starch. More preferably, the amylopectin content of the starch is at least 75, 80, 85, 90, or even 95%. The starches may be used as such as starch compound in the adhesive composition, or they may be modified.

Although the adhesive composition of the invention is starch-based, the adhesive composition may contain other compounds that contribute to its adhesive nature, such as for example proteins or synthetic polymers or mineral fillers.

Preferably, the amount of proteins in the adhesive composition is at most 15 or 10 wt. % (of dry matter). Preferred examples of proteins include casein, soy protein, pea protein, and wheat protein. More preferably, the amount of proteins in the adhesive composition is at most 8, 6, 5, 4, 3, 2, or even at most 1 wt. %.

Preferably, the amount of synthetic polymers in the adhesive composition is at most 20 or 15 wt. % (of dry matter). Preferred examples of synthetic polymers include acrylic polymers and acrylic copolymers. More preferably, the amount of synthetic polymers in the adhesive composition is at most 12, 10, 8, 6, 5, 4, 3, 2, or even at most 1 wt. %.

Preferably, the amount of mineral fillers in the adhesive composition is at most 15 wt. % (of dry matter), more preferably at most 10, 8, 6, 4, 2, or even at most 1 wt. %.

In a main preferred embodiment, the total amount of non-starch compounds that contribute to the adhesive nature is at most 25, preferably at most 20, 18, 16, 14, 12, 10, 8, 7, 6, 5, 4, 3, or even at most 2 wt. % of dry matter. In one preferred embodiment, the total amount of non-starch compounds that contribute to the adhesive nature is at least 1 wt. % of dry matter.

As given herein, all weight percentages are relative to the adhesive composition as a whole unless noted otherwise.

The adhesive composition according to the invention may contain further compounds other than compounds that contribute directly to its adhesive nature. The use of such compounds is as such known. Examples of categories of such compounds are buffering agents, antifoam agents, fluidizing agents, biocides, and plasticizing agents. One example of such a further compound is urea. If used, each one of such further compounds is typically used in an effective amount; such effective amounts can be easily determined by the person skilled in the art via routine experiments that determine the specific effect and compare it with the desired outcome.

The adhesive composition according to the invention has a tan δ at 10 Hz of at least 1.40. As meant herein, the term tan δ is used in its common meaning of being a loss tangent. It gives a ratio between viscous and elastic properties of a system, showing which one is the dominant one. With a tan δ value of 1, the elastic and viscous properties of the material are equal. The smaller the loss tangent is, the more elastic is the material. Based on the discovery that the visco-elastic properties of the adhesive composition should have certain characteristics, it was found that the tan δ, when measured at 20 degrees C. according to the method as given in Example 1 below and at a frequency of 10 Hz, should be at least 1.40 so that the adhesive composition may perform well in high-speed industrial bottling lines. Preferably, the tan δ is at least 1.41, 1.42, 1.43, 1.44, 1.45, 1.46, 1.47, 1.48, 1.49, or even at least 1.50, 1.51, 1.52, 1.53, 1.54, or even at least 1.55. The tan δ at 10 Hz preferably has a value of at most 3.0, 2.9, 2.8, 2.7, or 2.5.

It was found that the use of certain modified starches as a starch compound, preferably as the biggest or even as the whole of the starch compounds in the adhesive composition of the invention can be instrumental in achieving that the adhesive composition has a value of tan δ according to the invention.

As such, the modification of starches is known. Examples of such modifications include pre-gelatinisation, molecular weight reduction, cross-linking, and derivatisation, as disclosed in documents such as for example EP-A-0990687 (see paragraphs such as [0012], [0013], [0032]-[0036], and [0036]-[0046] in EP-A-0990687). Modifications of starches may also be combined with each other.

In a main embodiment of the invention, the modified starch is obtained via cross-linking. The modification step of cross-linking is as such known. The cross-linking may be executed on native starches, or on starches that were modified by means of for example esterification, etherification, or oxidization. Examples of cross-linking agents that can be suitable are sodium trimetaphosphate (STMP); $POCl_3$; epoxides such as for example epichlorohydrin; adipic acid anhydride; and aldehydes such as acetaldehyde, propionaldehyde and glyoxal. The cross-linking may be executed by means that are as such well-known.

In a further aspect of the main embodiment, the cross-linking may be combined with a thermal treatment that is aimed at a pre-gelatinisation and/or a reduction of the molecular weight of the modified starch. Such treatments are as such known; one example of such a treatment is an extrusion process.

In one embodiment, the modifications of cross-linking and molecular weight reduction are executed in succession; in another embodiment, they are combined in a reactive extrusion step that is as such known.

When implementing the cross-linking modification, it was found that when the degree of cross-linking is increased, the tan δ of an adhesive composition containing the so-modified starch will typically decrease. Thus, according to this embodiment of the invention care should be taken to ensure that the degree of cross-linking is sufficiently low.

Depending on the type of starch as used, it may be that a cross-linking step alone is already sufficient in order to achieve an adhesive composition according to the invention. It may however also be that a combination of a cross-linking step and a step reducing the molecular weight is necessary in order to achieve an adhesive composition according to the invention, or that other or further modification steps are needed, or that one or more modification steps not including cross-linking can achieve the goal of obtaining an adhesive composition according to the invention.

When implementing a modification aimed at reducing the molecular weight, it was found that, starting from the molecular weight of the native starch, a reduction in molecular weight will typically lead to a reduction of the viscosity of an adhesive composition containing the so-modified starch. It was moreover found that when the reduction in molecular weight is combined with a cross-linking step as described above, that the said reduction in molecular weight can lead to a favourable increase in the tan δ of an adhesive composition containing the so-modified starch.

When implementing the modification aimed at reducing the molecular weight, it was found that a progressive reduction can lead to modified starches which, when used as part of the starch compound, contribute only to a minor extent, and eventually not at all, to achieving an adhesive composition having a tan δ according to the invention. It is therefore preferred that the weight-averaged molecular weight of the modified starch as measured via GPC-MALLS according to the method as explained at Example 1 is still at least $0.5 \cdot 10^6$, $1 \cdot 10^6$, $2 \cdot 10^6$, in particular at least $3 \cdot 10^6$, $4 \cdot 10^6$, $5 \cdot 10^6$, $6 \cdot 10^6$, $7 \cdot 10^6$, or even $8 \cdot 10^6$ g/mol. It is preferred that the weight-averaged molecular weight of a modified starch as used in the starch compound according to the invention is at most $35 \cdot 10^6$, $30 \cdot 10^6$, $27 \cdot 10^6$, $25 \cdot 10^6$, $22 \cdot 10^6$, or even at most $20 \cdot 10^6$ g/mol.

When one or more modified starches are used as starch compound(s) in the adhesive composition of the invention, it is preferred that this is done such that the sum of all starch compounds that are modified starches is an amount lying between 5 and 55 wt. % of the adhesive composition as a whole, including solvents, more preferably between 10 or 15 and 50, or between 20, 25, or even 30 and 45 wt. %.

It was found that a starch compound as used in the adhesive composition of the invention preferably has a Brookfield viscosity of at most 2500 mPa·s, with spindle 5 at 100 rpm, whereby the measurement is done at 30° C. and on a test system of 25 wt. % dry matter of the starch compound in distilled water. This has the advantage that the adhesive composition as a whole can combine a favourable performance with regard to avoiding of splashing in bottle labelling applications, for which it is theorised that a certain viscosity is needed, with a favourable performance on other aspects that are also desirable in bottle labelling applications such as pumpability and the avoidance of heat build-up due to internal friction as a result of flow. In order to ensure that the starch compound has a Brookfield viscosity according to the invention, it may be helpful or even necessary to implement steps aimed at cross-linking and/or lowering of molecular weight, as known per se and referred to above. If the adhesive composition according to the invention contains more than one starch compound, then it is preferred that the majority (in wt. %), preferably at least 60, 70, or even 80 or 90 wt. % of starch compounds has a Brookfield viscosity as described here.

Preferably, the Brookfield viscosity is at most 2400, 2300, 2200, 2100, or even at most 2000 mPa·s. Furthermore, the Brookfield viscosity of the starch compound is preferably at least 100 mPa·s, more preferably at least 200, 300, 400, 500, 600, 700, 800, 900, or even at least 1000 mPa·s.

Further details on the measurement of the Brookfield viscosity are provided in Example 1.

It was found that a liquid or paste of 25 wt. % (dry matter) of a starch compound used in the adhesive composition of the invention in distilled water preferably has a Ford 8 cup flow viscosity of at most 40 s. As is known, the Ford cup viscosity measurement is established by measuring the time (in seconds) it takes for a measured amount of liquid to flow out of a funnel having a defined, circular aperture. In the case of measurements done in the context of the present invention, the diameter of the aperture is 8 mm, the amount of liquid/paste that should flow out of the funnel is 100 g, and the test temperature is 30° C. If the adhesive composition according to the invention contains more than one starch compound, then it is preferred that the majority (in wt. %), preferably at least 60, 70, or even 80 or 90 wt. % of starch compounds has a Ford 8 cup flow viscosity as described here.

Preferably, the Ford 8 cup flow viscosity is at most 36, 34, 32, 30, 28, or even at most 26 s. Furthermore, the Ford 8 cup flow viscosity is preferably at least 5, 8, 11, 14, or even at least 15 s.

Further details on the measurement of the Ford 8 cup flow viscosity are provided in Example 1.

It was found that a starch compound as used in the adhesive composition of the invention preferably has a high solubility in water. The starch compound preferably has a solubility in distilled water of at least 70 or 80%, when measured at 10 wt. % dry matter and at room temperature. More preferably, the solubility is at least 85, 90, or 95%. In particular, it is preferred that the starch compound is essentially fully soluble. If the adhesive composition according to the invention contains more than one starch compound, then it is preferred that the majority (in wt. %), preferably at least 60, 70, or even at least 80 or 90 wt. % of the starch compounds has a high solubility of at least 70 or 80% or even at least 85, 90, or 95% as described here.

Further details on the measurement of solubility are provided in Example 1.

The adhesive composition according to the invention contains at least one starch compound, but may optionally contain other compounds that contribute to its adhesive nature, such as for example proteins or synthetic polymers or mineral fillers. In such embodiments, it was found that there can be additional preferred embodiments in relation to the viscosity characteristics of the starch compound. If the amount of non-starch compounds in the adhesive composition that contribute to the adhesive nature exceeds 2 wt % (of dry matter), then the Brookfield viscosity of the starch compound preferably lies between 100 and 3500 mPa·s; preferably, the Ford 8 cup flow viscosity lies between 5 and 55 s.

In a main embodiment of the invention, the adhesive composition has a Shear Thinning Index (STI) of at least 0.78. As meant herein, STI is a parameter that indicates shear-thinning behaviour; it is the result of a fit to the known Power Law model (also known as Ostwald or Ostwald-de Waele model), for shear-rates between 10/s and 50/s. STI is a dimensionless number; it is in practice also referred to as Flow behaviour index, Power law index, or Flow index. A value below 1 indicates a shear-thinning fluid, a value above 1 indicates a shear-thickening fluid, and a value of 1 indicates a Newtonian fluid. As used herein, the STI is the value as determined from measurements done one week after preparation of the adhesive composition. According to the invention, the fit of the data, as expressed in $R^2$, should preferably be at least 0.95, more preferably at least 0.97 or even at least 0.99.

It was found that the acceptability of an adhesive composition in high-speed labelling applications is increased significantly once the STI is at or above 0.780; more preferably, the STI is at least 0.785, 0.790, 0.795, or even at least 0.800. The STI is preferably at most 1.100, in particular at most 1.050, 1.040, 1.030, 1.020, 1.010, 1.005, or 1.000.

It was found surprisingly that in order to achieve that an adhesive composition according to the invention has an STI within the ranges as given above, the same teachings as given above in relation to achieving a value of tan δ according to the invention apply. Thus, it is favourable according to a main embodiment to use a starch that has undergone the modification step of cross-linking and preferably also the modification step of molecular weight reduction as part of the starch compound in the adhesive composition, whereby it may be possible that an optimisation of the modification steps along the teachings as provided above may be needed in order to arrive at a result within the scope of this embodiment of the invention.

The adhesive composition according to the invention preferably is formulated such that the viscosity of the adhesive composition, when measured at 20° C. and a shear rate of 10/s with an Anton Paar Physica MCR 101 unit in a plate/plate configuration with a spindle diameter of 25 mm and a gap of 0.5 mm, lies between 20 Pa·s and 250 Pa·s, more preferably between 25 and 200 Pa·s, in particular between 30, 35, or 40 and 150 Pa·s.

Should it be desired to increase the viscosity of the adhesive composition according to the invention, then it is preferred to add a further starch compound that is specifically suitable for this purpose; such starches are as such well-known. A native or cross-linked cook-up starch can be used. All types of starch (potato, maize (corn), wheat, rice, tapioca and leguminous starches as well as their amylopectin equivalents) can be used. The native or modified (i.e. esterified, etherified, oxidized, etc) starch may be cross-linked with suitable cross-linkers such as STMP, $POCl_3$, epichlorohydrin, epoxides, adipic acid anhydride, aldehydes such as acetaldehyde, propionaldehyde and glyoxal, etc. The degree of cross-linking should be optimized to yield high and stable viscosities when cooked.

The invention also relates to the use of the adhesive composition according to the invention as adhesive, in particular for high-speed applications such as the labelling of bottles. Within the framework of the labelling of bottles, the term high-speed means at least 50,000, 55,000, 60,000, 65,000 or even at least 70,000 bottles per hour.

The invention furthermore relates to a bottle having a label, whereby an adhesive composition according to the invention was used to attach the label to the bottle. The bottle is preferably a glass bottle, such as for example a beer bottle.

The invention will be illustrated by means of the Examples below, without being limited thereto.

EXAMPLE 1

Preparation of a Modified Starch 30 kg of native waxy maize starch (Maisita 21.007) was brought into aqueous slurry form, then reacted with 20 g of STMP at 35° C. in a self-made reactor with temperature and pH control, to form a cross-linked starch. The cross-linked starch was then washed with water, dewatered and dried using a lab spin-flash-dryer (Anhydro).

The cross-linked starch was fed into a co-rotating twin screw extruder (Theysohn TSK-30/28D) with 7 different zones. The parameters of the extruder were: a 2×4 mm die, screw speed: 300 min$^{-1}$, water content: 22.5%. The screw configuration and temperature program is displayed in FIG. 1. The output strands of the extruder, consisting of modified starch, were cut into granules.

The extruded granules of modified starch (herein named: Modified Starch 1) were dried on a fluidized bed drier (Supplier: Jöst), then ground on a Fritsch Pulverisette 25 to a median particle size (as measured with a Malvern Mastersizer 2000) of 400 μm.

The weight-averaged molecular weight of Modified Starch 1, as determined via GPC-MALLS, was $10 \times 10^6$ g/mol. The GPC-MALLS measurement was carried out as follows: the equipment used was a Waters 717 with injector at room temperature, a Waters 515 HPLC pump, a Waters 2410 RI detector, a Wyatt Minidawn Tristar MALLS detector, and a degasser. The equipment ran on Astra software. The mobile phase was a mixture of DMSO with 50 mM LiBr, at a flow of 0.4 ml per min. The column consisted of 2 Styragel HMW 7 DMF columns, connected serially and regulated at 55° C. The MALLS detector had a dn/dc ratio of 0.066. The volume of the sample injected was 100 μl. The samples for the measurement were prepared by mixing 20 mg of Modified Starch 1 with 5 ml of the DMSO/LiBR mixture, followed by stirring for 15 min at 95° C., then allowing the sample to cool down under stirring to room temperature over a period of 18 hours. The sample was then centrifuged for 10 minutes at 10,000 rpm; the supernatans was diluted in 1:1 ratio with the DMSO/LiBr mixture, after which it was ready for injection.

Modified Starch 1 was also characterised in Brookfield viscosity. A calculated amount of distilled water for the preparation of 250 ml starch paste having 25 wt. % (dry matter) starch was put into a 400 ml beaker. The water was stirred with a 4 cm stirrer at 1000 rpm. An amount of 62.5 g (dry matter) of Modified Starch 1 was added to the distilled water under stirring. After the addition of the starch was complete, the stirring was continued at 2000 rpm for 3 minutes so as to obtain 250 ml of a starch paste having 25 wt. % dry matter starch. The temperature of the starch paste was adjusted to 30° C., the stirrer was removed and the Brookfield viscosity was determined by using a spindle 5. The result was 1728 mPa·s.

Modified Starch 1 was furthermore characterised in the Ford 8 cup viscosity test. A starch paste, prepared in identical fashion as for the measurement of the Brookfield viscosity, was taken. As is known, the Ford cup viscosity measurement is established by measuring the time (in seconds) it takes for a measured amount of liquid to flow through a funnel having a defined, circular aperture. The diameter of the aperture was 8 mm, the amount of outflowing starch paste that was timed was 100 g, and the test temperature was 30° C. The result was 24 s.

Modified Starch 1 was also characterised on solubility. A calculated amount of distilled water for the preparation of 200 ml starch paste having 10 wt. % (dry matter) starch was put into a 400 ml beaker at room temperature, i.e. 21° C. The water was stirred with a 4 cm stirrer at 1000 rpm. An amount of 20 g (dry matter) of Modified Starch 1 was added to the distilled water under stirring. After the addition of the starch was complete, the stirring was continued at 2000 rpm for 10 minutes so as to obtain 200 ml of a starch paste having 10 wt. % dry matter starch. The starch paste was then used to fill centrifuge tubes of 50 ml; the tubes were then centrifuged at 1500 rpm during 10 minutes. An amount of 10 g of the supernatant liquid was taken, put into a crystallizing dish, and dried. The amount of dry matter was determined, whereby an amount of 1 g would mean full (100%) solubility of the starch, an amount of 0.9 g would represent 90% solubility, etc. In this experiment, the solubility was 100%.

Preparation of Adhesive Composition 1

The ingredients as given in table 1 below, with the exception of 20% of the water and the Acticide MBS, were mixed together.

TABLE 1

| Ingredient | Amount (wt. %) |
| --- | --- |
| Water | 40.49 |
| Ammonium acetate [1] | 0.82 |
| Urea [2] | 16.45 |
| Silcolapse RG12 [3] | 0.2 |
| Modified Starch 1 | 32.9 |
| Cross-linked maize starch (non-pregelatinized) | 8.22 |
| Acticide MBS [4] | 0.3 |

Legend to Table 1
[1] Buffering agent.
[2] Stabiliser and gelling agent.
[3] Silicon-based anti-foaming agent.
[4] Biocide, blend of methyl and benzisothiazolinone (MIT and BIT; supplier: Thor).

The mixture of ingredients was heated under stirring to 65° C., then kept at that temperature for 10 minutes to form Adhesive Composition 1. The adhesive composition was then cooled to 20° C., and the remaining portion of the water and the biocide were added to the adhesive composition. The pH was brought to a value between 6.4 and 6.7; this can be done with either NaOH or HCl, whichever one is necessary—in this Example, the pH had to be reduced so that HCl was used. Using a minor amount of water, the viscosity of the adhesive composition was adjusted down, so that it had a value lying between 60 and 65 Pa·s when measured at 10/s, and between 45 and 50 Pa·s when measured at 40/s.

Determination of Visco-Elastic Properties

Visco-elastic properties of Adhesive Composition 1 were determined in an Anton Paar Physica MCR 101 unit, at 20°

C. The configuration was plate/plate, with a spindle diameter of 25 mm and a gap of 0.5 mm. The 'flow curve', being a measurement of shear rate dependant viscosity, was determined with a pre-shear at 3 s$^{-1}$ during 60 seconds, followed by varying the shear rate from 10 s$^{-1}$ to 50 s$^{-1}$ in 30 seconds. The tan δ at 10 Hz was determined in the context of a frequency sweep at a shear strain of 1%, whereby the frequency decreased logarithmically from 30 Hz to 0.1 Hz in 50 steps.

The tan δ at 10 Hz of Adhesive Composition 1 was determined to be 1.61. The shear thinning index STI was determined to be 0.79 by means of fitting the obtained data to the Power Law model; the fit was very good, having an R$^2$ of 0.99.

Use of the Adhesive Composition

Adhesive Composition 1 was used as labelling adhesive in a large-scale trial at a beer brewery. Labels were glued to beer bottles, at a line speed of up to 55,000 bottles per hour. No undue splashing of the adhesive composition was noted, the overall performance of the adhesive composition was good.

EXAMPLE 2

Using Modified Starch 1 as prepared in Example 1, a further adhesive composition, Adhesive Composition 2, was prepared. The composition of Adhesive Composition 2 is given in Table 2; the preparation was identical to the preparation as described in Example 1, with the exception that the mixture of ingredients was heated to 72° C. instead of to 65° C.

TABLE 2

| Ingredient | Amount (wt. %) |
| --- | --- |
| Water | 47.08 |
| Ammonium acetate | 0.55 |
| Urea | 12.47 |
| Modified Starch 1 | 27.23 |
| Cross-linked maize starch (non-pregelatinized) | 5.5 |
| Acticide MBS | 0.3 |
| Soap powder [1] | 0.185 |
| CaCo$_3$ [2] | 6.46 |
| Belcat A3 [3] | 0.19 |

Legend to Table 2
[1] Stabilizer, supplier Kay's Ltd.
[2] Filler, Durcal 5 from Omya, mean particle size 5 μm.
[3] Antifoam, supplier Minerals I Derivats.

The viscosity of Adhesive Composition 2 was determined to have a value lying between 60 and 65 Pa·s when measured at 10/s, and between 40 and 45 Pa·s when measured at 40/s. The tan δ of Adhesive Composition 2 was determined to be 1.58, and the STI was determined to be 0.78.

Adhesive Composition 2 showed good behaviour in a large-scale trial at a beer brewery. Labels were glued to beer bottles, at a line speed of up to 55,000 bottles per hour. No undue splashing of the adhesive composition was noted, the overall performance of the adhesive composition was good.

Comparative Experiment A

Figure 2:
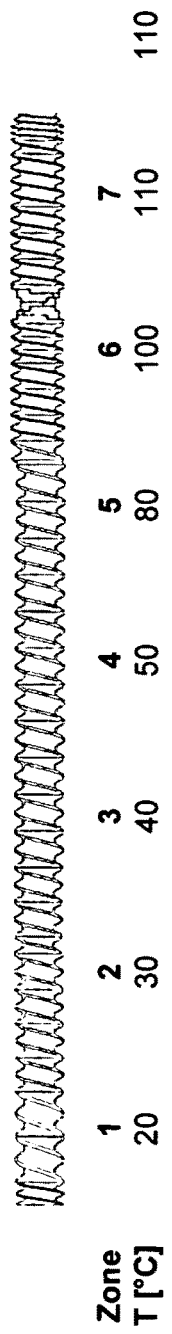
FIG. 2 illustrates the configuration and temperature profile of an extruder screw as used in Comparative Experiment A. The invention will be illustrated by means of the Examples below, without being limited thereto.

A modified starch (herein named: Modified Starch A) was prepared. Except for the configuration of the screws in the extruder, the preparation was done as in Example 1. The configuration of the screws as used is shown in FIG. 2. The main difference in configuration is that the screws as used in Example 1 had a kneading section in zone 4, whereas the screws as used in this Comparative Experiment A did not have a kneading section in zone 4. It is contemplated that the absence of the said kneading zone can have as consequence that the molecular weight of Modified Starch A is higher than the molecular weight of Modified Starch 1. The weight-averaged molecular weight of Modified Starch A, as determined via GPC-MALLS, was 31×10$^6$ g/mol.

An Adhesive Composition A was prepared; the composition and preparation were identical as described in Example 1, with the exception that Modified Starch A was used instead of Modified Starch 1.

The properties of Adhesive Composition A were determined in the same fashion as in Example 1. The tan δ at 10 Hz of Adhesive Composition 1 was determined to be 1.18. The shear thinning index STI was determined to be 0.68.

An attempt was made to use Adhesive Composition A as labelling adhesive on beer bottles in the same fashion as described in Example 1. It was however not at all possible to use the adhesive composition at desired high line speeds due to unacceptable splashing behaviour of the adhesive composition.

The invention claimed is:

1. A starch-based adhesive composition, wherein the starch comprises a modified starch having a weight-averaged molecular weight of at least 4×10$^6$ g/mol, and wherein the amount of the proteins in the adhesive composition is at most 15 wt. % based on dry matter, wherein the starch comprises at least one starch compound having a solubility in distilled water of at least 70%, when measured at 10 wt. % dry matter and at room temperature, said adhesive composition having a tan δ at 10 Hz and 20° C. of at least 1.40.

2. The adhesive composition according to claim 1, having a Shear Thinning Index (STI) of at least 0.78.

3. The adhesive composition according to claim 1, wherein the adhesive composition has a viscosity of at least 20 Pa·s, when measured at 20° C. and at a shear rate of 10/s.

4. The adhesive composition according to claim 1, wherein the starch comprises a starch compound chosen from the group consisting of maize starch, rice starch, and potato starch.

5. The adhesive composition according to claim 1, wherein the starch comprises at least one starch compound has a Brookfield viscosity lying between 100 and 2500 mPa·s when measured with spindle 5 at 100 rpm, when the measurement is done at 30° C. and on a test system of 25 wt. % dry matter of the starch compound in distilled water.

6. The adhesive composition according to claim 5, wherein 100 g of the at least one starch compound has a result in the Ford 8 viscosity measurement of at most 40 s, when the measurement is done at 30° C. and on a test system of 25 wt. % dry matter of the starch compound in distilled water.

7. The adhesive composition according to claim 1, also comprising a second starch compound.

8. The adhesive composition according to claim 1, also comprising at most 10 wt. % of proteins.

9. The adhesive composition according to claim 1, also comprising at most 20 wt. % of synthetic polymers.

10. The adhesive composition according to claim 1, also comprising at most 15 wt. % of mineral fillers.

11. The use of the adhesive composition according to claim 1, as labelling adhesive.

12. A bottle having a label attached to the bottle using the adhesive as claimed in claim 1.

13. The adhesive composition according to claim 1, wherein the adhesive composition also includes an unmodified starch.

14. The adhesive composition according to claim 13, wherein the unmodified starch comprises a starch compound chosen from the group consisting of maize starch, rice starch, and potato starch.

15. The adhesive composition according to claim 1, wherein the composition includes a starch having a weight-averaged molecular weight of at most $20 \times 10^6$ g/mol.

* * * * *